(12) United States Patent
Schüller

(10) Patent No.: US 10,718,462 B2
(45) Date of Patent: Jul. 21, 2020

(54) METHOD FOR PRODUCING A DOUBLE-WALLED PIPE AND A DOUBLE-WALLED PIPE

(71) Applicant: H. BUTTING GMBH & CO. KG, Wittingen-Knesebeck (DE)

(72) Inventor: Thomas Schüller, Hankensbüttel (DE)

(73) Assignee: H. Butting GmbH, Wittingen-Knesebeck (DE)

( * ) Notice: Subject to any disclaimer, the term of this patent is extended or adjusted under 35 U.S.C. 154(b) by 0 days.

(21) Appl. No.: 15/769,783

(22) PCT Filed: Oct. 20, 2016

(86) PCT No.: PCT/EP2016/075195
§ 371 (c)(1),
(2) Date: Apr. 20, 2018

(87) PCT Pub. No.: WO2017/068028
PCT Pub. Date: Apr. 27, 2017

(65) Prior Publication Data
US 2018/0313490 A1 Nov. 1, 2018

(30) Foreign Application Priority Data

Oct. 21, 2015 (DE) .................... 10 2015 117 871

(51) Int. Cl.
*F16L 58/08* (2006.01)
*F16L 9/02* (2006.01)
(Continued)

(52) U.S. Cl.
CPC ............ *F16L 58/08* (2013.01); *B21C 37/154* (2013.01); *B23K 9/0282* (2013.01); *B23K 9/048* (2013.01);
(Continued)

(58) Field of Classification Search
CPC . F16L 58/00; F16L 58/02; F16L 58/08; F16L 58/181; F16L 9/02; F16L 57/00;
(Continued)

(56) References Cited

U.S. PATENT DOCUMENTS 4,556,240 A * 12/1985 Yoshida .................. F16L 58/08
138/109
4,611,833 A * 9/1986 Lescaut ............... F16L 13/0263
285/55

(Continued)

FOREIGN PATENT DOCUMENTS

CN          2849396 A    12/2006
CN        101462193 A     6/2009
(Continued)

*Primary Examiner* — Philip C Tucker
*Assistant Examiner* — Brian R Slawski
(74) *Attorney, Agent, or Firm* — W & C IP

(57) ABSTRACT

The application relates to a method for producing a double-walled pipe (1) and a pipe (1) of this type, hating an outer pipe (3) which is press-fitted with an inner pipe (2) consisting of a corrosion-resistant alloy, wherein an adhesive (4) is inserted at least in regions between the outer pipe (3) and the inner pipe (2), wherein, after adhering the inner pipe (2) with the outer pipe (3), the inner pipe (2) and the adhesive layer (4) are removed at the pipe ends, and the inner side of the outer pipe (3) is plated via an integral connection with the inner pipe (2).

8 Claims, 1 Drawing Sheet

(51) Int. Cl.

| | | |
|---|---|---|
| *F16L 9/147* | (2006.01) | |
| *B21C 37/15* | (2006.01) | |
| *B29C 65/48* | (2006.01) | |
| *B29C 65/56* | (2006.01) | |
| *B29C 65/72* | (2006.01) | |
| *B29C 65/00* | (2006.01) | |
| *B29C 63/00* | (2006.01) | |
| *B29C 63/48* | (2006.01) | |
| *B32B 15/04* | (2006.01) | |
| *B32B 15/08* | (2006.01) | |
| *B32B 37/00* | (2006.01) | |
| *B23K 9/23* | (2006.01) | |
| *B23K 9/235* | (2006.01) | |
| *B23K 26/38* | (2014.01) | |
| *F16L 58/18* | (2006.01) | |
| *B23K 9/04* | (2006.01) | |
| *B23K 9/173* | (2006.01) | |
| *B23K 9/028* | (2006.01) | |
| *B23K 101/06* | (2006.01) | |
| *B23K 103/18* | (2006.01) | |
| *B23K 103/16* | (2006.01) | |
| *B23K 101/10* | (2006.01) | |
| *B23K 103/04* | (2006.01) | |

(52) U.S. Cl.
CPC .............. *B23K 9/173* (2013.01); *B23K 9/232* (2013.01); *B23K 9/235* (2013.01); *B23K 26/38* (2013.01); *F16L 58/181* (2013.01); *B23K 2101/06* (2018.08); *B23K 2101/10* (2018.08); *B23K 2103/04* (2018.08); *B23K 2103/166* (2018.08); *B23K 2103/18* (2018.08); *B29C 63/0013* (2013.01); *B29C 63/0017* (2013.01); *B29C 63/0073* (2013.01); *B29C 63/481* (2013.01); *B29C 63/486* (2013.01); *B29C 65/48* (2013.01); *B29C 65/565* (2013.01); *B29C 65/72* (2013.01); *B29C 66/301* (2013.01); *B29C 66/349* (2013.01); *B29C 66/5221* (2013.01); *B29C 66/612* (2013.01); *B29C 66/632* (2013.01); *B29C 66/712* (2013.01); *B32B 15/043* (2013.01); *B32B 15/08* (2013.01); *B32B 2307/714* (2013.01); *F16L 9/02* (2013.01); *F16L 9/147* (2013.01)

(58) Field of Classification Search
CPC ....... F16L 57/06; F16L 13/0263; F16L 58/10; F16L 58/1009; F16L 9/14; F16L 9/147; F16L 13/0254; B21C 37/154; B23K 2103/04; B23K 2103/05; B23K 2103/166; B23K 2103/18; B23K 2101/06; B23K 26/36; B23K 26/38; B29C 65/00; B29C 65/48; B29C 65/4855; B29C 65/56; B29C 65/565; B29C 65/66; B29C 65/665; B29C 65/72; B29C 65/02; B29C 66/00; B29C 66/301; B29C 66/349; B29C 66/02; B29C 66/026; B29C 66/5221; B29C 66/612; B29C 66/63; B29C 66/632; B29C 66/712; B29C 63/00; B29C 63/0017; B29C 63/0073; B29C 63/18; B29C 63/22; B29C 63/26; B29C 63/48; B29C 63/481; B29C 63/483; B29C 63/485; B29C 63/486; B32B 1/08; B32B 15/00; B32B 15/04; B32B 15/043; B32B 15/08; B32B 15/18; B32B 2307/714
USPC ......... 156/60, 83, 84, 85, 86, 150, 151, 153, 156/154, 155, 156, 160, 165, 242, 244.11, 156/244.13, 244.14, 244.18, 244.21, 156/244.27, 247, 248, 249, 250, 267, 268, 156/272.2, 272.8, 278, 280, 282, 285, 156/287, 293, 294, 296, 701, 703, 711; 138/140, 141, 143, 145
See application file for complete search history.

(56) References Cited

U.S. PATENT DOCUMENTS

| | | | | |
|---|---|---|---|---|
| 4,883,292 | A * | 11/1989 | Kuroki ................. | F16L 58/181 285/55 |
| 5,009,737 | A * | 4/1991 | Lescaut ................. | B29C 66/742 156/264 |
| 2005/0166987 | A1* | 8/2005 | Matsubara ............ | B21C 37/154 138/142 |
| 2010/0028085 | A1* | 2/2010 | Rocher .................... | F16L 1/161 405/169 |
| 2012/0160361 | A1* | 6/2012 | Fischer ................ | B23K 31/027 138/145 |
| 2016/0312930 | A1* | 10/2016 | Safari .................... | B23K 31/02 |

FOREIGN PATENT DOCUMENTS

| | | | | |
|---|---|---|---|---|
| CN | 101628355 A | | 1/2010 | |
| DE | 200 16 937 U1 | | 2/2002 | |
| DE | 20016937 U1 | * | 2/2002 | ............. F16L 9/04 |
| EP | 2 377 627 A1 | | 10/2011 | |
| GB | 2 521 190 A | | 6/2015 | |
| JP | 58128815 A | * | 8/1983 | ............ B29C 49/26 |
| WO | WO-2015087162 A1 | * | 6/2015 | |

* cited by examiner

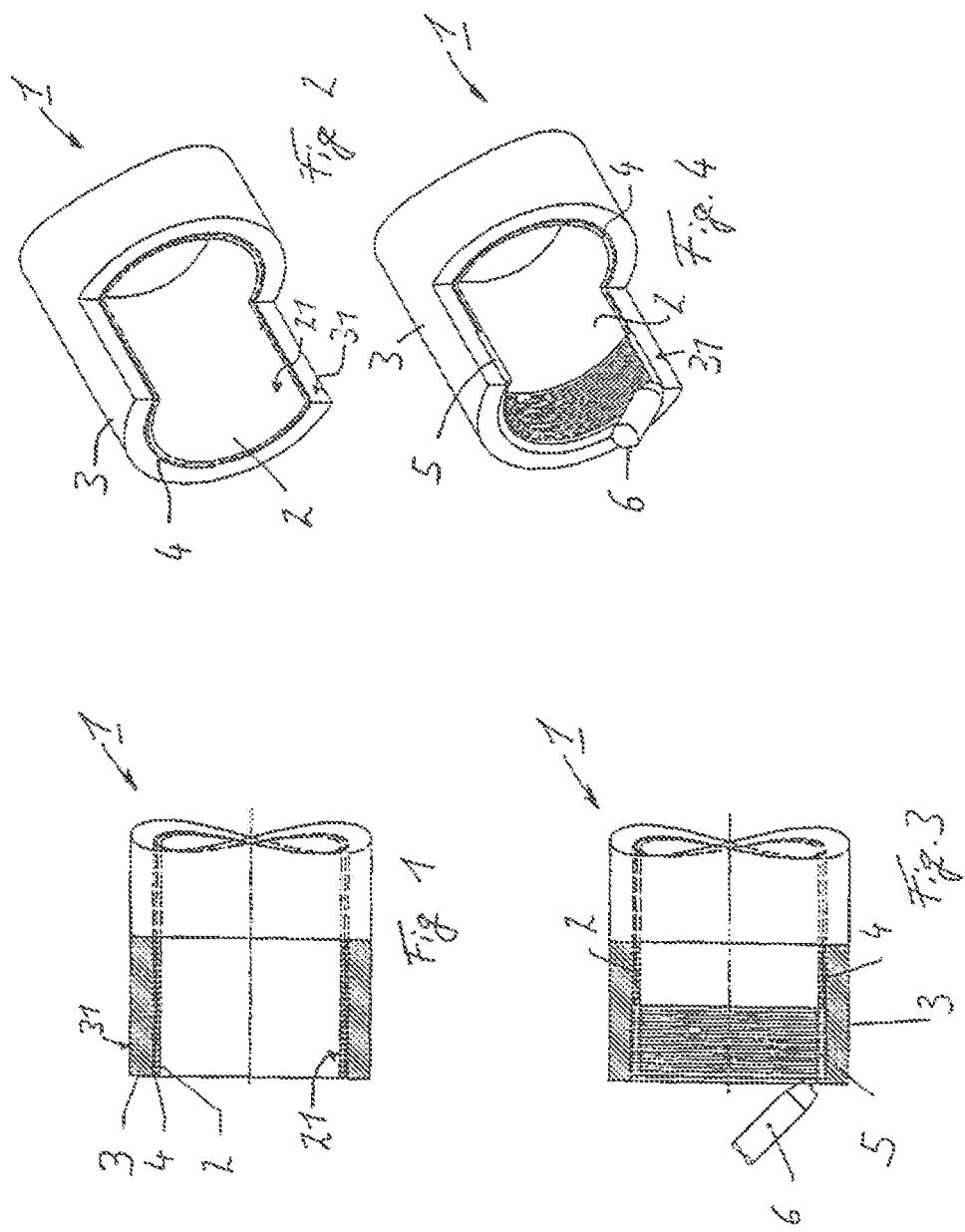

METHOD FOR PRODUCING A DOUBLE-WALLED PIPE AND A DOUBLE-WALLED PIPE

FIELD OF THE INVENTION

The invention relates to a method for producing a double-walled pipe having an outer pipe that is pressed together with an inner pipe preferably made of a corrosion-resistant alloy, wherein an adhesive is introduced at least in certain regions between the outer pipe and the inner pipe. The invention also relates to such a double-walled pipe.

BACKGROUND

DE 200 16 937 U1 discloses a bimetallic pipe that consists of a ferritic outer pipe into which is pressed, in an internal high-pressure forming method, an inner pipe made of a corrosion-resistant alloy, for example stainless steel. The essential feature in the production of pipes of this kind is a hydraulic three-dimensional expansion process of an inner pipe in a seamless or welded outer pipe at ambient temperature. In the process, the inner pipe is first widened elastically and then plastically between 2% and 5& until it bears against the internal wall of the outer pipe. This is followed by widening of the inner and outer pipes together, by approximately 0.5% to 1%, during which the outer pipe is held by a two-part outer tool. The mechano-hydraulic joining method makes it possible to join together a large number of different materials, provided that the starting material meets the strength criteria.

SUMMARY

In order to also use a bimetallic pipe for what is referred to as the reeling method, in which pipes are wound onto large reels and then drawn off, generally in the context of laying offshore pipes, it is proposed that an adhesive is provided at least in certain regions between the outer pipe and the inner pipe, in order to prevent the inner pipe or the liner detaching from the outer pipe or creasing during unrolling. The adhesive is preferably a permanently elastic adhesive which can withstand high tensile and shear forces. The adhesive can be applied in the form of annular adhesive sleeves and then distributed evenly over the lateral surface of the inner pipe before the latter is inserted into the outer pipe. In order to ensure defect-free welding of bimetallic pipes to form a pipeline, it is expedient if the two pipe ends of each bimetallic pipe are free from adhesive. The end faces of the pipes should also be free from adhesive.

The present invention has the object of providing a method that permits simple production of double-walled, reelable pipes. The invention has the further object of providing an improved, double-walled, reelable pipe.

According to the invention, this object is achieved with a method having the features of the main claim and a double-walled pipe having the features of the further independent claim. Advantageous configurations and refinements of the invention are disclosed in the dependent claims, the description and the figures.

The inventive method for producing a double-walled pipe having an outer pipe that is pressed together with an inner pipe preferably made of a corrosion-resistant alloy, wherein an adhesive is introduced at least in certain regions between the outer pipe and the inner pipe, provides that, after adhesive bonding of the inner pipe to the outer pipe, the inner pipe and the adhesive layer are removed at the pipe ends, and the inside of the outer pipe is plated forming a material-bonded connection with the inner pipe. The inner pipe is pressed into the outer pipe by widening from within; alternatively or in addition pressing is achieved by pressing the outer pipe together or by reducing the internal diameter of the outer pipe, for example by cooling or by reducing an internal pressure after widening of the outer pipe. Removing part of the inner pipe and the adhesive layer permits high-quality application of the weld-plating to the inside of the outer pipe so as to also be able to satisfy the safety requirements for weld-plating or for a double-walled pipe. If weld-plating is carried out with the presence of adhesive or adhesive residue, there is the risk of inclusions, voids or pores forming within the weld-plated layer, which can impair the durability and quality and possibly also the required stability of the pipe. The material-bonded connection of the weld-plating with the outer pipe and with the inner pipe makes it possible to provide a mechanically stable pipe end which can easily be connected to a corresponding double-walled pipe by welding at the end faces, making it possible to produce long, reelable pipes consisting of the double-walled pipe sections. The adhesive layer effectively avoids creasing of the inner pipe or liner during rolling and unrolling of the pipe strand onto and from the pipe reel, so that on one hand there is nothing to impede the flow and on the other hand there is no danger of corrosion in the interspace between the fold of the inner pipe and the outer pipe.

Weld-plating of the inside of the pipe ends of the outer pipe protects the outer pipe against wear, oxidation and corrosion. The weld-plating connects the different materials of the inner pipe and of the outer pipe in a material-bonded manner, the material that is weld-plated to the inside of the outer pipe being more highly alloyed than the material of the outer pipe.

The pipe ends of the inner pipe can be removed thermally and/or mechanically in order to gain access to the adhesive layer that is located in the region of the pipe ends, between the inner pipe and the outer pipe, or in order to gain access to the outer pipe, after removal of the pipe ends of the inner pipe, over the length destined for application of the weld-plating. In the region of the pipe end that is to be separated, the inner pipe can be separated mechanically, for example by lathing, milling or grinding, but also by thermal methods such as laser beam cutting, laser beam oxygen cutting or thermal cutting. Alternatively or in addition, use is made of abrasive or other material-removing separating methods in which the inner pipe by physical and chemical active principles in the form of electrical energy, thermal energy, chemical reactions and combinations thereof used for cutting. The pipe ends can be removed entirely thermally and/or mechanically, or it is alternatively possible to remove just a slit or an annular part of the inner pipe and then remove the separated part of the inner pipe, which is held only by the adhesive layer, from the outer pipe. Removing the inner pipe section that is to be removed is performed for example by the application of tensile forces or compressive forces or by the application of torsional forces, in order to break the hold of the adhesive. It is also possible, after the mechanical and/or thermal separation or parting of the pipe end of the inner pipe that is to be removed, to remove the adhesive layer chemically, electro-chemically, thermally or mechanically, or to reduce or destroy the adhesive force of the adhesive to the point that the separated inner pipe end can be removed from the outer pipe.

After removal of the inner pipe end, any adhesive remaining in the region of the pipe ends on the inside of the outer pipe can be removed thermally, chemically and/or mechanically, for example by heating, combustion, chemical dissolution or conversion or by mechanical finishing methods. It is also possible to remove adhesive from a region between the inner pipe and the outer pipe, after removal of an inner pipe end, so as to obtain an adhesive-free gap between the inner pipe and the outer pipe.

The surface of the inside of the outer pipe can be chemically and/or mechanically processed prior to plating, in order to ensure improved adhesion between the plated-on material and the outer pipe. In particular, residues of adhesives and possibly of the materials used for removing the adhesives are removed by machining the inside of the outer pipe. Thus, the surface is cleaned and possibly prepared by surface treatment such that optimal plating can take place.

During production of the double-walled pipe, the inner pipe is first adhesively bonded over the entire length such that two essentially equal-length pipe sections of the inner pipe and the: outer pipe: produce a double-walled pipe as an intermediate product, the pipes being adhesively bonded to one another over the entire length and advantageously also over their entire surface area. This simplifies the application of the adhesive since errors in guiding the pipes during insertion of the inner pipe into the outer pipe are unproblematic as no regions of the inner pipe or Of the outer pipe should be excluded from application of adhesive. The full-surface area adhesive bonding of the inner pipe to the outer pipe produces a reliable arrangement of the inner pipe with respect to the outer pipe and prevents creasing of the inner pipe Cr liner during reeling.

The inner pipe is advantageously made of a corrosion-resistant alloy, in particular a chromium-nickel steel or a nickel-based alloy, the outer pipe preferably being a pipe made of a carbon steel. The weld-plating connects the different types of steel to one another in a material-bonded manner.

The adhesive used is preferably a permanently elastic adhesive in order to be able to compensate for differences in thermal expansion or possibly relative movement between the inner pipe and the outer pipe during loading and laying.

The inner pipe and/or the outer pipe can be cooled during plating. By means of the weld-plating, which is advantageously carried out in a circumferential welding process in which during the welding process the pipe is rotated relative to the plated-on material or a welding torch or an electrode, first of all the truncated inner pipe is connected to the outer pipe in a material-bonded manner by the weld-plating material. Starting at this region inside the outer pipe, more material is then deposited in a helical shape in the direction of the pipe end until the weld-plating extends, on the inside of the outer pipe, from the truncated inner pipe to the pipe end at the end face. In order to avoid excessive temperature peaks that might reduce the adhesive strength of the adhesive, localized cooling acting on the pipes from inside or from outside is advantageous. Cooling can start prior to beginning the weld-plating. During weld-plating, cooling can be provided both from inside and from outside, and it is also possible to cool just from one side. Subsequent cooling can also take place.

The weld-plating material forms a closed sheath over the inside of the outer pipe and covers the inside of the latter, wherein the material used for plating is also corrosion-resistant.

The double-walled pipe having an outer pipe that is pressed together with an inner pipe, preferably the inner pipe is pressed into the outer pipe, wherein an adhesive is arranged at least in certain regions between the outer pipe and the inner pipe, provides that a weld-plating that connects the outer pipe to the inner pipe in a material-bonded manner is applied at the pipe ends of the outer pipe. Thus, the inner pipe is truncated compared to the outer pipe, this corresponding to the length of the weld-plating by means of which the inner pipe is coupled to the outer pipe in a material-bonded manner, wherein the weld-plating is preferably applied to the full surface area of the inside of the outer pipe in order to protect the outer pipe from mechanical and chemical effects. The inner pipe is preferably made of a corrosion-resistant alloy, in particular a chromium-nickel steel or a nickel-based alloy, while the outer pipe is preferably made of a carbon steel.

The weld-plating is preferably applied to the outer pipe over a length of 50 mm to 250 mm as seen from the pipe end, in order to provide, over a sufficient length, a wholly metallic end face of the double-walled pipe so that two end faces of mutually opposite double-walled pipes can readily be welded to one another. The length of the weld-plating means that the pipe ends or the end faces can be mechanically pre-machined in order to permit reliable and automatable welding of pipe ends to produce a long pipe strand.

The weld-plating preferably extends as far as the end of the outer pipe, so that the inside of the outer pipe is fully protected against corrosion, namely first by the weld-plating and then, over the remaining length of the pipe, by the inner pipe or liner.

The internal diameter of the weld-plating preferably corresponds to the internal diameter of the inner pipe, which ensures that no vortices or flow obstructions arise in the double-walled pipe, and a double-walled pipe of near-constant internal diameter can be provided even when pipe ends are welded to one another.

BRIEF DESCRIPTION OF THE DRAWINGS

There follows a more detailed explanation of an exemplary embodiment of the invention, with reference to the appended drawings, in which:

FIG. 1 is a view in section of a double-walled pipe end after adhesive bonding;

FIG. 2 is a perspective partial view in section of the pipe end of FIG. 1;

FIG. 3 is a view in section of a pipe end after removal of an inner pipe part and during weld-plating; and FIG. 4 is a perspective partial view in section of FIG. 3.

DETAILED DESCRIPTION

FIG. 1 shows, in a partial view in section, one end of a double-walled pipe 1 having an inner pipe 2 that is adhesively bonded to an outer pipe 3 by means of an adhesive layer 4 applied to the full surface area. The outer pipe 3 is made of a carbon steel and is substantially thicker than the inner pipe 2, which is designed as what is referred to as a liner and is made of a corrosion-resistant material, preferably a chromium-nickel steel or a nickel-based alloy. In order to produce the double-walled pipe 1, the entire surface area and the entire length of the outside of the inner pipe 2, or the inside of the outer pipe 3, is provided with the adhesive 4. In the non-assembled state, the external diameter of the inner pipe 2 is smaller than the internal diameter of the outer pipe 3. After insertion of the inner pipe 2 into the outer pipe 3, the inner pipe 2 is widened mechanically, for example hydro-mechanically, such that the outside of the inner pipe 2 comes into contact with the adhesive 4 and together at least slightly widens the outer pipe 3. Alternatively or in combination, the inner pipe 2 can be inserted into a widened outer pipe 3 whose internal diameter is then reduced, for example by relaxation, compression of the outer pipe or cooling. At the end of the mechanical plating procedure, the inner pipe 2 bears evenly against the inside of the outer pipe 3 and is strongly bonded thereto by means of the adhesive layer 4. In addition, the inner pipe 2 is positioned and fixed in the outer pipe 3 by means of the mechanical clamping owing to the different return paths of the inner pipe 2 and the outer pipe 3 due to the mechanical widening or compression.

Both FIG. 1 and FIG. 2 show that the adhesive layer is applied evenly over the entire circumference of the inner pipe 2 and the internal circumference of the outer pipe 3, the adhesive layer 4 extends up to the end face of the double-walled pipe 1, and thus the inner pipe end 21 is also connected to the outer pipe end 31 by the adhesive layer 4. The further processing of the double-walled pipe 1 proceeds from this state.

FIGS. 3 and 4 show a pipe end of a double walled pipe 1 at the end of its completion. One part of the inner pipe end 21 has been removed, for example by lathing, milling or grinding the inner pipe end 21. Alternative methods for removing the inner pipe end 21 can include making a circumferential slit and pulling out the separated pipe end, possibly after removal or deactivation of the adhesive layer 4 in that region. The circumferential slit can be created by mechanical removal or parting methods, but also by thermal parting methods such as thermal cutting, laser oxygen cutting or electro-chemical or chemical processes. After removal of the inner pipe end 21, any remaining adhesive layer 4 is fully removed. This removal can be carried out thermally, mechanically, chemically or using a combination of several of these methods. It is also possible and provided that the surface of the inside of the outer pipe end 31, which is free from the adhesive layer 4, is mechanically machined, for example ground or polished. This is followed by depositing a weld-plating 5, using a welding torch 6, onto that part of the double-walled pipe 1 from which the inner pipe end 21 has been removed. The deposition of the weld-plating 5 can be performed in a circumferential deposition process in which either the double-walled pipe 2, or the welding torch 6 together with the welding material that is to be deposited, is rotated. The weld-plating 5 extends up to the pipe end, that is to say up to the end face of the outer pipe 3, and connects the outer pipe 3 to the inner pipe 2 in a material-bonded manner. In the process, the adhesive layer 4 preferably reaches up to just before the weld-plating 5. In order to avoid thermal damage in the weld zone, the outer pipe 3 and/or the inner pipe 2 can be cooled, in particular locally cooled, during weld-plating.

The internal diameter of the weld-plating 5 corresponds to the internal diameter of the inner pipe 2, it still being possible for the weld-plating 5 to be mechanically machined after the deposition welding in order to achieve an essentially smooth-walled surface of the weld-plating 5. After completion of the weld-plating 5, the end face of the outer pipe end 31 is entirely metallic, the weld-plating can extend into the double-walled pipe 1 over a length of 50 mm to 250 mm from the end face of the outer pipe 3.

The invention claimed is:

1. A method for producing a double-walled pipe having an outer pipe that is pressed together with an inner pipe made of a corrosion-resistant alloy, the method comprising:
    introducing an adhesive at least in certain regions between the outer pipe and the inner pipe for adhesive bonding of the inner pipe to the outer pipe;
    removing the inner pipe at pipe ends of the inner pipe and removing an adhesive layer of the adhesive at pipe ends of the outer pipe; and
    plating an inside of the outer pipe to form a material-bonded connection with the inner pipe.

2. The method as claimed in claim 1, wherein the pipe ends of the outer pipe are weld-plated on the inside.

3. The method as claimed in claim 1, further comprising removing the pipe ends of the inner pipe thermally and/or mechanically.

4. The method as claimed in claim 1, further comprising removing a portion of the adhesive in a region of the pipe ends Om the inside of the outer pipe and/or between the inner pipe and the outer pipe, wherein removing is performed thermally and/or mechanically.

5. The method as claimed in claim 1 wherein a surface of the inside of the outer pipe is chemically and/or mechanically processed prior to plating.

6. The method as claimed in claim 1 wherein the inner pipe is adhesively bonded over an entire length of the inner pipe.

7. The method as claimed in claim 1 wherein the inner pipe is adhesively bonded over an entire surface area of the inner pipe.

8. The method as claimed in claim 1 further comprising cooling during plating the inner pipe and/or the outer pipe.

* * * * *